US012617120B2

(12) United States Patent
Aydin et al.

(10) Patent No.: US 12,617,120 B2
(45) Date of Patent: May 5, 2026

(54) WOOD PROTECTING METHODS AND WOOD PRODUCTS PRODUCED WITH THE METHODS

(71) Applicant: ORGANOWOOD AB, Täby (SE)

(72) Inventors: Juhanes Aydin, Södertälje (SE); Salman Hassanzadeh, Vallentuna (SE); Lidija Glavas, Hägersten (SE)

(73) Assignee: ORGANOWOOD AB, Taby (SE)

( * ) Notice: Subject to any disclaimer, the term of this patent is extended or adjusted under 35 U.S.C. 154(b) by 91 days.

(21) Appl. No.: 17/782,702

(22) PCT Filed: Dec. 14, 2020

(86) PCT No.: PCT/SE2020/051206
§ 371 (c)(1),
(2) Date: Jun. 6, 2022

(87) PCT Pub. No.: WO2021/118450
PCT Pub. Date: Jun. 17, 2021

(65) Prior Publication Data

US 2023/0037562 A1 Feb. 9, 2023

(30) Foreign Application Priority Data

Dec. 13, 2019 (SE) .................................... 1951454-6

(51) Int. Cl.
*B05D 7/00* (2006.01)
*B27K 3/02* (2006.01)
(Continued)

(52) U.S. Cl.
CPC .............. *B27K 3/0214* (2013.01); *B27K 3/16* (2013.01); *B27K 5/001* (2013.01); *B27K 5/0085* (2013.01); *B27K 2240/70* (2013.01)

(58) Field of Classification Search
CPC ........................................................ B05D 7/00
See application file for complete search history.

(56) References Cited

U.S. PATENT DOCUMENTS 2,889,232 A * 6/1959 Linnell .................. C01G 25/02 106/312
3,547,688 A 12/1970 Gagliardi
(Continued)

FOREIGN PATENT DOCUMENTS

CN 104552514 A 4/2015
DE 4438563 A 5/1996
(Continued)

OTHER PUBLICATIONS

WO-9913716-A1 English Translated (Year: 1999).*
(Continued)

*Primary Examiner* — Kelly M Gambetta
*Assistant Examiner* — Mohammad Mayy
(74) *Attorney, Agent, or Firm* — Tucker Ellis LLP

(57) ABSTRACT

Disclosed herein is an environmentally friendly wood protecting method against biological deterioration such as fungal, bacterial and insect damage and non-biological wood deterioration such as weathering. The method comprises contacting a wood material with an aqueous solution of a zirconium salts which is followed by a heat treatment step, providing durable protection of wood against biodegradation and improving several other properties of the treated wood.

18 Claims, 6 Drawing Sheets

(51) Int. Cl.

| | |
|---|---|
| ***B27K 3/16*** | (2006.01) |
| ***B27K 5/00*** | (2006.01) |

(56) References Cited

U.S. PATENT DOCUMENTS

| | | | | | |
|---|---|---|---|---|---|
| 3,663,261 | A * | 5/1972 | Miettinen | B27K 3/0214 | 522/89 |
| 5,612,094 | A * | 3/1997 | Schubert | B27K 3/32 | 427/427 |
| 5,681,880 | A | 10/1997 | Desor | | |
| 5,733,666 | A | 3/1998 | Sinko | | |
| 2005/0222309 | A1 | 10/2005 | Bauer et al. | | |
| 2006/0011094 | A1 | 1/2006 | Harper | | |
| 2006/0127433 | A1* | 6/2006 | Gohary | A01N 31/08 | 424/405 |
| 2007/0023954 | A1* | 2/2007 | Laver | B29C 48/904 | 425/308 |
| 2011/0250359 | A1 | 10/2011 | Sinko | | |
| 2016/0115337 | A1* | 4/2016 | Lu | C09D 15/00 | 427/393 |

FOREIGN PATENT DOCUMENTS

| | | | | |
|---|---|---|---|---|
| EP | 1034903 | A1 | 9/2000 | |
| EP | 1716995 | A2 | 11/2006 | |
| GB | 809766 | A | 3/1959 | |
| JP | H11139905 | A | 5/1999 | |
| JP | H11156813 | A | 6/1999 | |
| JP | H11165303 | A | 6/1999 | |
| JP | H11514364 | A | 12/1999 | |
| WO | 1997014303 | A1 | 4/1997 | |
| WO | 9845053 | A | 10/1998 | |
| WO | WO-9913716 | A1 * | 3/1999 | A01N 35/06 |
| WO | 2007081359 | A | 7/2007 | |

OTHER PUBLICATIONS

International Search Report from corresponding International Application No. PCT/SE2020/051206, mailed on Jan. 28, 2021, 4 pages.

* cited by examiner

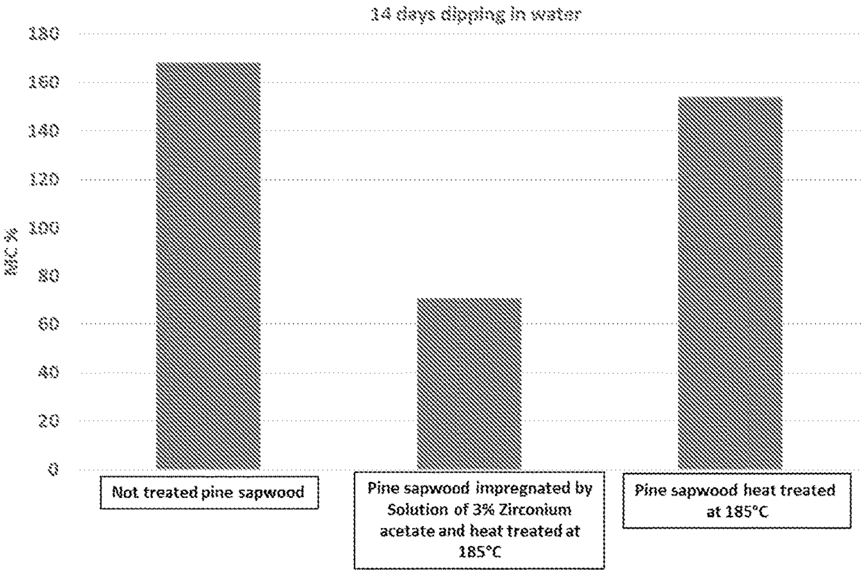

Fig 3

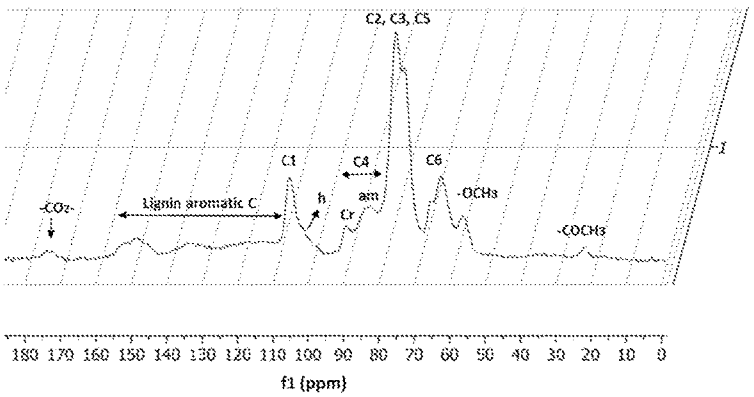

| Chemical shift (ppm) | Assignment |
|---|---|
| 173 | COO in acetyl groups of hemicelluloses |
| 153 | S 3/5e, G 4e |
| 148 | S 3/5f, G 3 |
| 146 | G 4f |
| 136 | S 1/4e, G1e |
| 133 | S 1/4f, G1f |
| 130 | G 6 |
| 116 | G 5 |
| 112 | G 2 |
| 105 | C-1 of cellulose |
| 102 | C-1 of hemicelluloses |
| 89 | C-4 of crystalline cellulose |
| 84 | C-4 of amorphous cellulose |
| 72-75 | C-2/C-3/C-5 of cellulose |
| 65 | C-6 of crystalline cellulose |
| 62 | C-6 of amorphous cellulose |
| 56 | OCH3 in lignin |
| 21 | CH3 in acetyl groups of hemicelluloses |

S = syringyl, G = guaiacyl, e = etherified C-4, f = free phenolic C-4

Fig. 4

WOOD PROTECTING METHODS AND WOOD PRODUCTS PRODUCED WITH THE METHODS

TECHNICAL FIELD

The present invention relates to an environmentally friendly wood protecting method against biological deterioration such as fungal, bacteria and insect damage and non-biological wood deterioration such as weathering. The method comprises contacting a wood material with an aqueous solution of a zirconium salts which is followed by a heat treatment step, providing durable protection of wood against biodegradation and improving several other properties of the treated wood.

BACKGROUND OF THE INVENTION

Structurally wood can be regarded as a porous and fibrous, hydrophilic and hard biocomposite composed mainly of cellulose, hemicellulose and lignin. Due to its nature, wood is vulnerable to environmental degradation including both physical and microbiological factors. Traditionally various biocides and pesticides are being used to preserve and protect wood against rot, fungus and insects. These compounds very often have a negative impact on human health and environment. For this reason, new avenues for obviating attacks from rot, fungus and insects have been attracting considerable amount of attention amongst researchers. There is a need for a solution for modifying wood with enhanced resistance to biodegradation without having a negative impact on nature and human health, especially when it comes to protecting wood in harsh conditions such as in ground contact. When it comes to wood not only is protection against wood destroying fungus, rot and insects a very important feature but also properties such as lowered water uptake, better dimensional stability, increased mechanical strength and enhanced protections against natural weathering are highly important factors that contribute to the expanded usage of wood as for example building material.

Various protective technologies exist with different protection efficiencies both regarding economy and environmental impacts. Current technologies can be categorized to "surface" and "in-depth" protection. Beside any other problems, the surface protection technologies such as organic coatings suffer from their anisotropic protection and lack of protection mechanism for the whole mass and inner part of the wood, making surface protection vulnerable to physical damages to the thin surface coating.

The "in depth" protection technologies are either "chemical impregnation" or "Thermal treatment". But, most of the existing "in depth" protection technologies display major drawbacks. For example, there is a category of "chemical impregnation" based technologies using various biocides which display huge environmental issue (such as Ammoniacal Copper Quinolate with boron (ACQ-B), Copper Azole with boron (CBA), Chromated Copper Arsenate (CCA) and similar chemicals). Other technologies known as environmentally friendly also display shortcomings, for example: complex/expensive production of acetylated and furfurylated wood and decreased mechanical properties in heat treated wood.

Zirconium as 20th element in abundance in the earth's crust lies in Group IVB of the periodic table. Zirconium exhibit a preferred oxidation state of 4 with not known redox chemistry under these conditions. Zirconium displays high charge to radius ratio and will hydrolysis and form polymeric species upon dissolution in water where the zirconium atoms are linked and bridged by hydroxyl groups. Further hydrolytic polymerization of these polymeric species can be happened by ageing, heating or by a reduction in acidity to form a polymer with a charged or neutral character.

The polymeric species of zirconium in the aqueous solution can interact chemically and physically with different functional groups of organic polymers. The reaction of the aqueous zirconium species is known for example with carboxyl, hydroxyl, and amine groups. The reaction of the zirconium with functional groups of organic polymers can be controlled significantly by altering temperature, pH and chelating agents. The zirconium polymeric species based on the used amount, physical parameters and extent and type of the functionalities in the organic polymers can induce cross-linking bonds, improve adhesion properties of the treatments and surfaces and increase the resistance to the heat, scrubbing, water/solvents.

Zirconium salts have previously been suggested as an agent to prevent microbial degradation of wood products, see US2011250359; WO9845053; GB809766; U.S. Pat. Nos. 3,547,688 and 5,612,094. However, none of these disclosures outline a process wherein zirconium salts can be further employed to improve other important characteristics of wood materials.

Document U.S. Pat. No. 5,612,094 describes a method wherein wood material is contacted with a water-based composition comprising one or more zirconium salts, and drying the wood material. It is important to note that the document describes drying at low temperatures. To dry wood material at low temperatures is standard within the industry, as drying at high temperatures is known to cause deteriorated mechanical properties and impaired colour characteristics.

Thus, there is still a need for a method for modifying wood resulting in enhanced resistance to biological deterioration, but without impairing the mechanical properties of the wood material.

SUMMARY OF INVENTION

An object of the present invention is to provide wood protection with zirconium compositions with long protective duration against biological deterioration and negligible leakage.

It is another object of the present invention to provide wood protection with zirconium compositions that enhances the mechanical properties of the wood material.

It is also an object of the present invention to provide wood protection with zirconium compositions that enhances hydrophobicity and decreases moisture content of a treated wood material, thereby contributing to a dimensional stability of the material.

It is still another object of the present invention to provide wood protection with zirconium compositions that avoids discoloration of the wood material and maintains compatibility with conventional coating materials.

In one general aspect the invention relates to a method of preparing a wood product, comprising the steps of contacting a wood material with a water-based composition comprising one or more zirconium salts; and heat treating the wood material at a temperature of between 100 to 220° C., more preferably between 115 to 200° C., most preferably between 135 to 185° C.

It has surprisingly been found that drying a wood material that has been treated with a water-based composition comprising one or more zirconium salts at high temperatures, will result in wood material with enhanced resistance to biodegradation whilst also exhibiting enhanced mechanical properties of the wood material. Without being bound to theory, it is believed that the high temperature enables effective chemical bonding between the zirconium salt with the hydroxyl and carboxyl groups of the wood. This reduces or eliminates the strength-loss of heat treated wood material attributed to the degradation of hemicelluloses and amorphous cellulose by reducing said degradation mechanisms.

The zirconium salts are preferably selected so that a protonated counter ion to zirconium in the salt has a boiling point that is lower than the temperature of the heat treatment step.

The example of the zirconium salt with different anionic counter ions soluble in water are but not limited to Zirconium Acetate, Ammonium Zirconium Carbonate, Zirconium Bromide, Zirconium Chloride, Zirconium Hydroxynitrate, Zirconium Nitrate, Zirconium Oxide Diperchlorate Octahydrate, Zirconium Oxychloride, Zirconium Oxynitrate, Zirconium Sulfate, Zirconium Sulfate Tetrahydrate, Zirconyl Chloride, Zirconium Acetate Hydroxide, Zirconium orthosulphate and Zirconium sulphamate.

In one aspect of the method, the composition comprises 0.01 to 30% (w/w), preferably 0.1 to 15% (w/w) and more preferably 0.2 to 6% (w/w) of zirconium ions from one or more zirconium salts, preferably the zirconium salt is zirconium acetate.

In one aspect of the method, the composition has a pH value of 2 to 13, preferably 2 to 11 and more preferably of 2 to 9.

In one aspect of the method, the contacting step is performed by soaking, impregnating, padding, foularding, dipping, spraying, brushing, coating, rolling, foam-application, preferably by vacuum pressure impregnation.

In one aspect, the method comprises a step of drying the wood material to a moisture content of less than 20% before heat treating (i.e. curing of) the wood material.

In one aspect, the method comprises a pretreatment step of drying the wood product to less than 40% moisture content before its contact with the water-based composition.

In one aspect, the method comprises a pretreatment step of heating the wood product to temperatures of 5 to 250° C. before its contact with the water-based composition.

In one aspect, the method comprises heating the water-based composition to less than 100° C. before contacting the wood material.

In one aspect, the method comprises heating both the wood product and the water-based composition before the contacting step.

In another general aspect, the invention relates to a wood product treated according to any of the previously described methods.

Preferably, a wood product as treated with methods of the invention has chemical bonds between zirconium atoms and hydrophilic functional groups selected from hydroxyl groups and carboxylic groups in the hemicellulose, cellulose or lignin in the treated wood material.

A wood product according to the invention, preferably has a lower crystalline index (CrI) compared to the same heated wood product, not contacted with the water-based composition comprising one or more zirconium salts. The crystalline index Crib is calculated from a 13C CPMAS NMR spectrum having a peak area X from the chemical shifts in the range of 86-92 ppm representing crystalline cellulose, a peak area Y from chemical shifts in the range of 79-96 ppm, representing amorphous cellulose, so the CrI is calculated by the formula (X/X+Y)*100.

A wood product according to the present invention generally has improved resistance to heat, rot, fungus, mold, bacteria, insects and weathering.

In one embodiment, when the wood product is prepared according to the inventive methods from a wood material of pine sapwood, the CrI is less than that of wood material of pine sapwood heat treated at the same temperature but not been contacted with the water-based composition.

In the wood products of the present invention, the zirconium salts form chemical/physical bonds between the impregnated zirconium salt and the chemical components in the cell walls of wood and/or cellulose itself which leads to making the treated wood protected against microbiological and bio-environmental factors such as rot, weathering, moisture dimensional change and mold/mildew attack and similar degradation phenomena.

The water-based compositions used with the methods and products of the present invention generally comprise one or more zirconium salt, water and optionally at least one of: a defoamer, a preservative, a rheology modifier, a wetting agent and a UV stabilizer, wherein the ingredients of the liquid composition according to the invention may have any ratio of the above mentioned chemicals. One of the most important feature of the water based compositions (for protection against rot, fungus and insects) is that it stays within the wood and that leaching is prevented which is supported by the mentioned optional additives.

For the zirconium salt, the present invention relates to an environmentally friendly impregnation liquid formula of water soluble zirconium salts, with pH value of 2 to 13, preferably 2 to 11 and more preferably of 2 to 9, wherein the weight percentage of zirconium ions from zirconium salt is in the range of 0.01 to 30% (w/w), preferably 0.1 to 15% (w/w) and more preferably 0.2 to 6% (w/w).

A wetting agent may according to the present invention refer to any surfactant, a thickener or a stabilizer. A surfactant may be ionic or non-ionic. The surfactant may be chosen from the class of surfactants which are defined as non-ionic emulsifiers having HLB values from 1 to 41 and that have wetting properties on wood. In one embodiment the emulsifier is not affecting the reactivity of the zirconium oxide function and wood hydrophobicity after heat treatment. In preferred embodiments of the invention, a wetting agent is used in amounts of less than 7 w/w % preferably from 0, 01 to 4 w/w %, more preferably from 0.1 to 3 w/w %. Examples of a wetting agent include, but are not limited to, Lutensol TO5 from BASF, Lutensol TO7 from BASF, Brij S10 from CRODA and similar.

A defoamer in the compositions used with the present invention provides less foaming during production and application. Examples of suitable defoamers include, but are not limited to, EO/PO type defoamers, silicones, tri-butyl phosphate, alkylphthalates, emulsion type defoamers, fatty acid based defoamers and the like. In a preferred embodiment Dispelair CF 56 (Oy Chemec Ab (Ltd) is used.

A dye and a pigment according to the present invention refer to any dye and pigment used to induce different coloring than the original wood color. A dye and pigments may be organic or inorganic. In a preferred embodiment of the invention, dye and pigments are used in amounts of less than 7 w/w % or from 0.01 to 4 w/w %, most preferably from 0.1 to 3 w/w %.

Rheology modifiers can be used in order to change the rheology profile to fit a specific type of application method.

Different types of rheology modifiers are for example fumed hydrophobic (Wacker HDK H30RM) and hydrophilic silica nanoparticles (Wacker HDK V15) (Wacker chemie AG), starches and its derivatives, or cellulose derivatives such as carboxymethyl cellulose. Suitable concentrations of the rheology modifier in the water based formulation of the invention may be for example in between 0.5% to 5% (w/w).

The UV stabilizer agent may in the compositions used with the present invention refer to any molecules that absorb/scatter UV radiation to reduce the UV degradation (photo-oxidation) of a wood material. The UV stabilizer may be organic or inorganic. In a preferred embodiment of the invention, UV stabilizer agents are used in amounts of less than 7 w/w % or from 0.01 to 4 w/w %, most preferably 0.1 to 3 w/w %.

The water based composition as used with the invention is a stable formulation, preferably with a shelf life of more than 1 month at room temperature or lower or at temperatures ranging from 0-65° C.

In the methods of the present invention, the water based formulation can be applied to the wood material with non-pressure impregnation methods, comprising brushing and spraying, dipping, soaking, diffusion method, Boucherie process (sap displacement), hot and cold bath (see Richardson 1978, Tsoumis 1991, Walker 2006). Alternatively, the water based formulation is applied to the wood material with pressure impregnation methods, comprising Impregnation, which combine vacuum and pressure, Bethell process (full-cell), vacuum process (full-cell), Rueping process (empty-cell), double Rueping process (empty-cell), Lowry process (empty-cell), oscillating pressure process, cascade process, Nordheim process, Cellon or Drilon process, pressure-stroke process, Boulton process, Poulain process, etc. (see Ille 1959, Richardson 1978, Tsoumis 1991, Walker 2006). The most preferred method of impregnation is vacuum/pressure impregnation. Times, temperatures and pressures are adjusted depending on wood type until essentially sufficient impregnation is reached.

The wooden materials used with the present invention can be selected from spruce, pine, birch, oak, redwood, cedar or composite materials such as plywood, fiber boards, particle boards, or pulp based materials such as paperboard, corrugated board, gypsum grade paperboard, specialty paper or molded pulp products.

The wooden material, after the drying step, preferably has a moisture content of less than 20% or less before entering the heat treatment (curing) step in the wood treatment process. The drying step is performed at room temperature or lower or elevated temperature such as 15-135° C., especially at 25-105° C.

The drying method according to the invention can be performed using any drying techniques such as microwave, IR, pulse, induction, air drying, Kiln-drying, Dehumidification, Vacuum-drying, Solar kiln, Water seasoning, Boiling or steam seasoning, Chemical or salt seasoning, Electrical seasoning and similar. The method can be performed in the absence or presence of vacuum, inert atmosphere, steam, or ambient atmosphere, until essentially dry, preferably less than 20% moisture content.

The heat treatment (curing) according to the method of the invention can be performed by using any heating techniques under different atmospheric conditions such as Westwood process, ThermoWood process, Plato Process (Ruyter 1989; Boonstra, Tjeerdsma and Groeneveld 1998), Retification (Vernois 2000), Les Bois Procedure, Thermovacuum process (Vacwood), microwave, IR, pulse, induction, air drying, Kiln-drying, and similar. Non-limiting examples of atmospheric conditions that can be used are inert atmospheres such as nitrogen atmosphere, steam and ambient atmosphere or reduced ambient atmosphere. The heat treatment can be done under different program cycles, heating rates and heating times. Preferably, the curing/heat treatment step is performed during 1 to 72 hours. The whole heat treatment may comprise 2 stages. In the first stage drying is performed and in second stage curing is performed. The drying temperature, time program and technique can be chosen differently aiming at reaching moisture content of the wood≤20%. The mild curing step according to the invention then can be adjusted to between 100 to 220° C., more preferably between 115 to 200° C., most preferably between 135 to 185° C.

BRIEF DESCRIPTION OF DRAWINGS

The invention is now described, by way of example, with reference to the accompanying drawings, in which:

FIG. 3 shows enhanced hydrophobicity of the wood and decreased moisture content by dipping a wood material according to the invention in water.

FIGS. 4 and 5 show 13C CPMAS NMR spectra of wood products treated or not treated with the present invention.

DETAILED AND EXEMPLIFYING DESCRIPTION OF THE INVENTION

Figure 1:
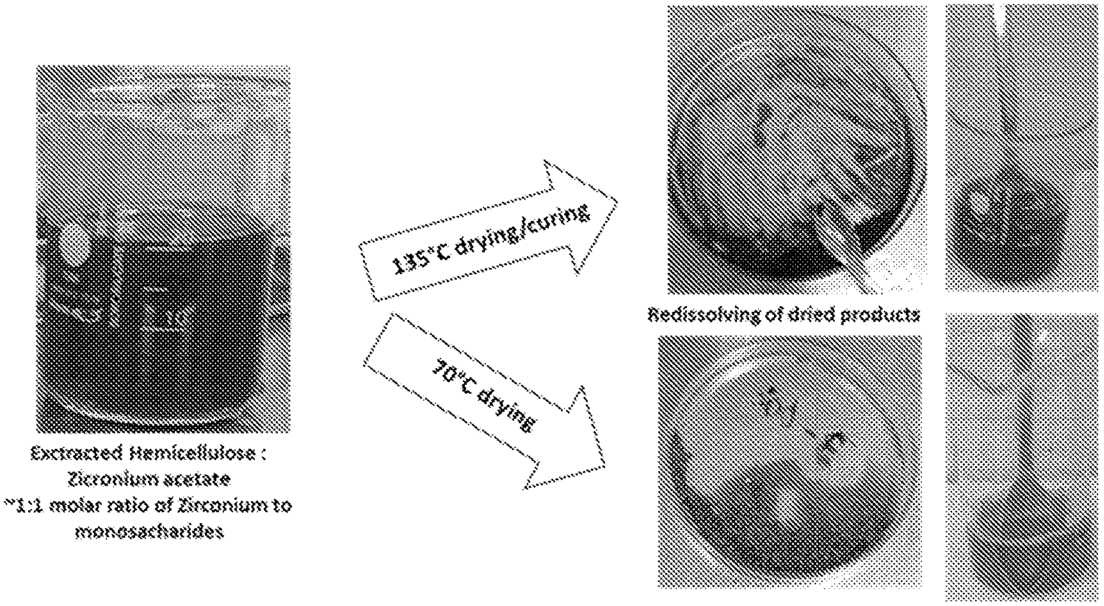
FIG. 1 shows a model reaction of zirconium acetate (water soluble) with wood hemicellulose (water soluble) under curing conditions creating an insoluble reaction product.

One of the most important features of an impregnating liquid (protection against rot fungus and insects) is that it stays within the wood and that leaching is prevented and kept to a minimum under natural/accelerated weathering conditions. This is a highly important feature in order to prolong the service lifetime of the treated wood. The present inventors have found that heat treatment (curing) of the impregnated wood was necessary in order to force the zirconium salt to create physical and chemical bonds with the hydroxyl and carboxyl groups of the wood. In order to elucidate the reaction of Zirconium salts with wood, a model reaction (FIG. 1) was devised where Zirconium acetate (water soluble) was reacted with extracted wood hemicellulose (water soluble) in a molar ratio of 1:1 (monosaccharide:Zr) and thereafter cured at 135° C. This resulted in a product that was not water soluble anymore due to the chemical reaction of the Zirconium acetate with the reactive groups of the hemicellulose (hydroxyl, carboxylic groups and similar). It was evident that there had been crosslinking between the structures. Therefore the same phenomena can be expected to occur in zirconium acetate impregnated and heat treated wood where the reactive groups in the chemical components of wood (Cellulose, Hemicellulose and Lignin) are reacted with zirconium salts.

General Procedures of the Composition Preparation 1-2 According to the Invention:

Method 1.

Step a) Mixing zirconium salt composition and water in any order of addition, Step b) Adding deformer, wetting agent and other optional component to the resulting mixture in step a, wherein the resulting mixtures in steps a-b are optionally mixed and/or optionally homogenized.

Method 2.

Step a) Mixing deformer, wetting agent and other optional component to the water Step b) Adding zirconium salt to the resulting mixture in step a, wherein the resulting mixtures in steps a-b are optionally mixed and/or optionally homogenized.

The apparatus for preparing the water-based composition is any kind of laboratory or industrial equipment using low and/or high shear forces for producing the homogenous composition of the invention. This might be a magnet stirrer, overhead stirrer with propeller or disperser or like, homogenizer with or without high pressure, in-line or external homogenizers, extruders, shaking equipment, mortar and pestle, blender type of instrument, any kind of mixer (static mixer, micro mixer, vortex mixer, industrial mixer, ribbon blender, V blender, continuous processor, cone screw blender, screw blender, double cone blender, double planetary, high viscosity mixer, counter-rotation, double and triple shaft, vacuum mixer, high shear rotor stator, dispersion mixer, paddle, jet mixer, mobile mixer, drum mixer, intermix mixer, planetary mixer, Banbury mixer or like), French press, disintegrator, mill (grinding by bead mill, colloid mill, hammer mill, ball mill, rod mill, autogenous mill, semiautogenous grinding, pebble mill, high pressure grinding rolls, buhrstone mill, vertical shaft impactor mill, tower mill or like), ultrasonic treatment, rotor-stator mechanical equipment, any kind of propeller or mixer, high temperature and/or high pressure bitumen emulsifiers or combinations of the above.

Table 1 below summarizes the examples demonstrating the invention in the following sections of the specification.

TABLE 1

| Ex Number | Composition | Composition preparation method | Wood treatment | Wood type | Heat treatment |
|---|---|---|---|---|---|
| Ex 1 | 3% Zirconium acetate Powder ($ZrO_2$~48%) A.M.P.I. S.r.l | Method 1 | Vacuum pressure impregnation | Scot pine sapwood | 135° C. |
| Ex 2 | 3% Zirconium acetate Powder ($ZrO_2$~48%) A.M.P.I. S.r.l | Method 1 | Vacuum pressure impregnation | Scot pine mix sap and heartwood | 135° C. |
| Ex 3 | 3% Zirconium acetate Powder ($ZrO_2$~48%) A.M.P.I. S.r.l | Method 1 | Vacuum pressure impregnation | Scot pine sapwood | 185° C. |
| Ex 4 | 3% Zirconium acetate Powder ($ZrO_2$~48%) A.M.P.I. S.r.l | Method 1 | Vacuum pressure impregnation | Scot pine mix sap and heartwood | 185° C. |
| Ex 5 | 5% Zirconium acetate Powder ($ZrO_2$~48%) A.M.P.I. S.r.l | Method 1 | Vacuum pressure impregnation | Scot pine sapwood | 135° C. |
| Ex 6 | 5% Zirconium acetate Powder ($ZrO_2$~48%) A.M.P.I. S.r.l | Method 1 | Vacuum pressure impregnation | Scot pine sapwood | 185° C. |
| Ex 7 | 10% Zirconium acetate Powder ($ZrO_2$~48%) A.M.P.I. S.r.l | Method 1 | Vacuum pressure impregnation | Scot pine sapwood | 135° C. |
| Ex 8 | 10% Zirconium acetate Powder ($ZrO_2$~48%) A.M.P.I. S.r.l | Method 1 | Vacuum pressure impregnation | Scot pine mix sap and heartwood | 135° C. |
| Ex 9 | 10% Zirconium acetate Powder ($ZrO_2$~48%) A.M.P.I. S.r.l | Method 1 | Vacuum pressure impregnation | Scot pine sapwood | 185° C. |
| Comparative Ex 10 | | | | Scot pine sapwood | 135° C. |
| Comparative Ex 11 | | | | Scot pine sapwood | 185° C. |
| Comparative Ex 12 | | | | Scot pine sapwood | |
| Comparative Ex 13 | | | | Scot pine mix sap and heartwood | |
| Comparative Ex 14 | 3% Zirconium acetate Powder ($ZrO_2$ ~48%) A.M.P.I. S.r.l | Method 1 | Vacuum pressure impregnation | Scot pine sapwood | 70° C. |

The described structural change in the wood due to the reaction with zirconium salts under curing conditions has several impacts on the properties of wood. These are exemplified in the following Examples:

Example 1

Decrease of the hydrophilicity of the wood by the reaction of zirconium salts with the hydrophilic functional groups in the wood:

As it can be seen in FIG. 1, a cloudy/opaque dispersion (not water soluble) was created by mixing water soluble components hemicellulose and zirconium acetate and curing at 135° C. The said property can be due to chemical bonding of the zirconium acetate with the hydrophilic functional group of the hemicellulose (hydroxyl, carboxylic acid and similar) and crosslinking of the saccharide based molecules.

Example 2

Figure 2:
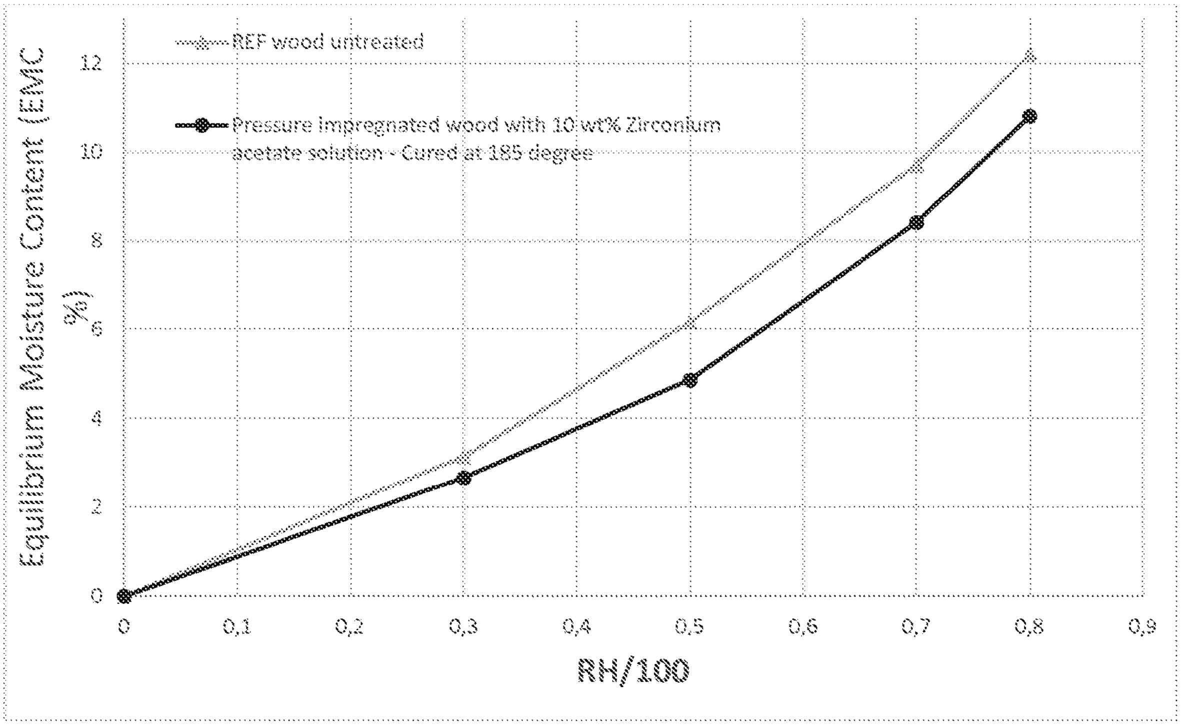
FIG. 2 demonstrates moisture sorption of a wood material according to the invention.

Enhanced hydrophobicity of the wood and decreased moisture sorption is demonstrated in FIG. 2. As can be seen in FIG. 2, due to the hydrophobic character of the modification, the wood impregnated with Zirconium acetate and heat treated at 185° C. is displaying lower equilibrium moisture content at the same relative humidity compared to original/not treated wood reference.

Example 3

FIG. 3 shows enhanced hydrophobicity of the wood and decreased moisture content by dipping in water. The amount of the absorbed water in the wood impregnated with zirconium acetate and heat treated at 185° C. is much lower compared to untreated wood and only heat treated wood.

Example 4

In general when heat treating wood, there is a color change on the wood that can be connected to the amount of degradation occurring in the wood during the heat treatment process. An assessment on the color change of wood due to the heat treatment was made using not impregnated wood and zirconium salt impregnated wood. There was basically no change in colour before and after heat treatment in the zirconium salt impregnated wood. It was even evidenced that the presence of more zirconium salt could protect the wood against color change during the heat treatment at the given temperature. The impregnated wood with 3% and 10% zirconium acetate, heat treated at 185° C., were submitted for sensory panel evaluation. The sensory panel utilized individuals trained to compare wood products and evaluate color changes. Brownish color was ranked on a scale from 0 describing no brown color, to 5 describing very dark brown color. Untreated wood is ranked 0. Not impregnated but heat treated wood is ranked 3. According to the results shown in table 1 below, it can clearly be seen that the wood impregnated with 10% zirconium acetate solution could offer less color change, and hence less wood degradation, during heat treatment at 185° C. Evidently, the presence of zirconium salts in wood during the heat treatment process have a protecting role against thermal degradation to some extent. Table 2 below shows the color change evaluation of heat treated wood.

TABLE 2

| Wood treatment according to invention | Sensory panel evaluation of color change |
|---|---|
| Original wood | 0 |
| Not impregnated but heat treated at 185° C. | 3 |
| 3% Zirconium acetate + heat treatment at 185° C. | 3 |
| 10% Zirconium acetate + heat treatment at 185° C. | 2 |

Example 5

In order to further assess the invention, Solid-state 400 MHz NMR spectrometer was used to record the one-dimensional (1D) $^{1}H \rightarrow ^{13}C$ CPMAS spectra. Fine powders of all samples were prepared of the non-treated, heat treated and zirconium salt impregnated and heat treated wood for solid NMR recording. $^{13}C$ CPMAS NMR spectrum and signal assignment of Scots pine wood is displayed in FIG. 4 where Cr refers to crystalline, am to amorphous and h to hemicelluloses.

Figure 5:
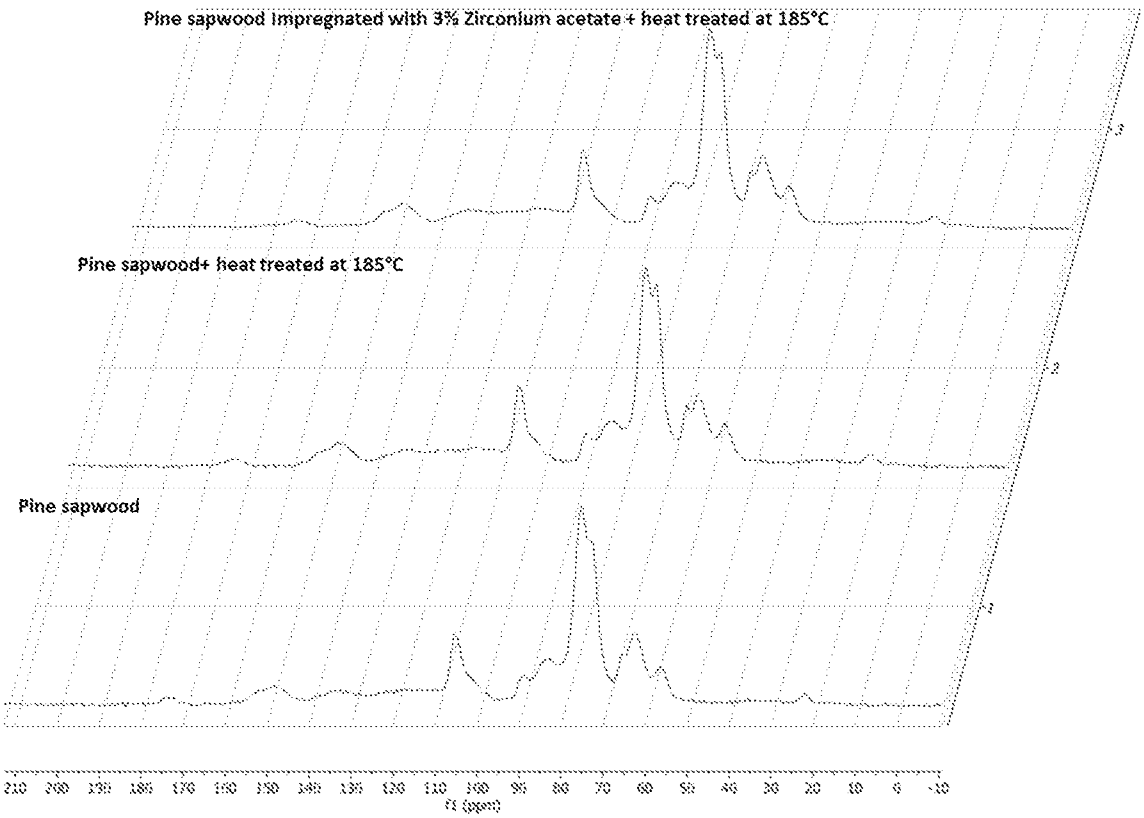

The recorded $^{13}C$ CPMAS NMR spectra of pine sapwood, "pine sapwood+ heat treatment 185° C." and "pine sapwood impregnated with 3% zirconium acetate+heat treatment 185° C." can be seen in FIG. 5. Firstly, the identification of the wood chemical components was performed qualitatively. The $^{13}C$ CPMAS NMR spectra of the wood samples is dominated by the signals assigned to cellulose. While further study of the hemicelluloses in the wood matrix is more complex due to the strong overlap of the signals assigned to hemicelluloses and cellulose, the signals of lignin are fairly without any interference (due to their different chemical nature).

During the heat treatment of wood, acetic acid is formed from the hydrolysis of acetyl esters in xylan. Hemicelluloses are depolymerized into oligomeric and monomeric units and further dehydrated to aldehydes under acidic conditions, leading to fewer hydroxyl groups and less hygroscopic wood. The effect of the heat treatment on the de-polymerization of cellulose is rather limited, instead by a small increase in cellulose crystallinity. Lignin is the least active component and can be cleaved to form phenolic groups only at high temperature. Therefore it's believed that the modifications of wood properties as well as the strength-loss of heat treated wood in general mainly is a result originating from the thermal degradation of hemicelluloses via an acidic autocatalytic reaction.

In order to form a comparative degradation study between the different treatments, the crystallinity of cellulose, determined as crystallinity index (CrI), was calculated by deconvolution from the area of the crystalline cellulose (86-92 ppm) C-4 signal, X, and the area of the amorphous cellulose (79-86 ppm) C-4 signal, Y (Wikberg, Hanne. 2004. Advanced Solid State NMR Spectroscopic Techniques. PhD thesis, Helsinki, Finland: University of Helsinki):

$$CrI = \frac{X}{X+Y} \times 100$$

Figure 6:
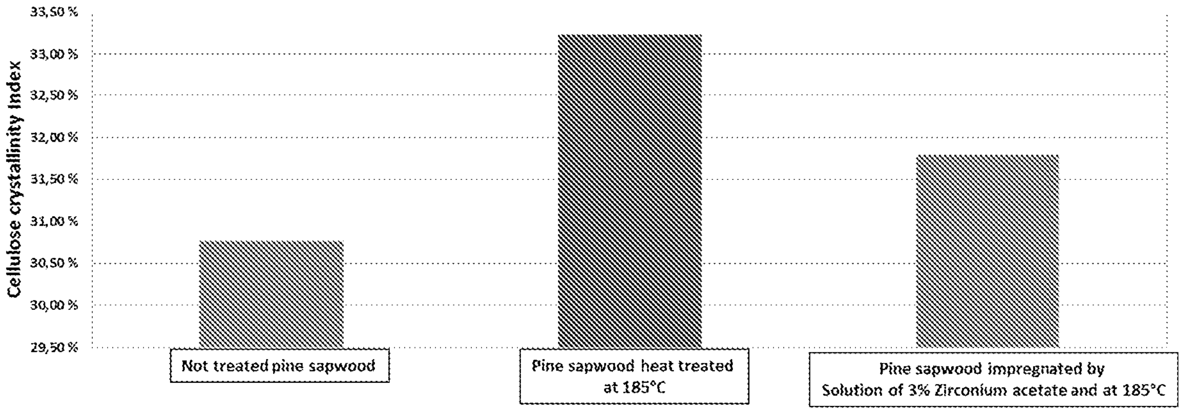
FIG. 6 shows crystallinity index for wood products treated and not treated with the invention.

The more degradation in the amorphous area can be correlated to a higher crystallinity index CrI of samples (Table 2 and FIG. 6). Quantitative $^{13}C$ solid NMR show that the Cellulose crystallinity (ratio of the peak integrals of the "crystalline cellulose" to the "crystalline+ amorphous" cellulose) of the pine sapwood impregnated with Zirconium acetate and heat treated at 185° C. is less than the pine sapwood heat treated at 185° C. This means the degradation of the hemicellulose and amorphous cellulose is less when wood is impregnated with Zirconium acetate.

Quantative $^{13}C$ solid NMR show that the Cellulose crystallinity (ratio of the peak integrals of the "crystalline cellulose" to the "crystalline+ amorphous" cellulose) of the pine sapwood impregnated with Zirconium acetate and heat treated at 185° C. is less than the pine sapwood heat treated at 185° C. This means the degradation of the hemicellulose and amorphous cellulose is less when wood is impregnated with Zirconium acetate.

Example 6

The weight loss of the wood during heat treatment as a result of thermal degradation of biopolymers to small/volatile molecules is another sign of the degradation extent. The gravimetric analysis of the wood samples and amount of released low molecular weight volatile molecules during the heat treatment process was assessed by weighing the dry wood before heat treatment and after heat treatment at 185° C. The results display controlled degradation and mass loss of around 2% in the impregnated wood with 3% of Zirconium acetate Zirconium which is quite similar to the not impregnated wood.

Figure 7:
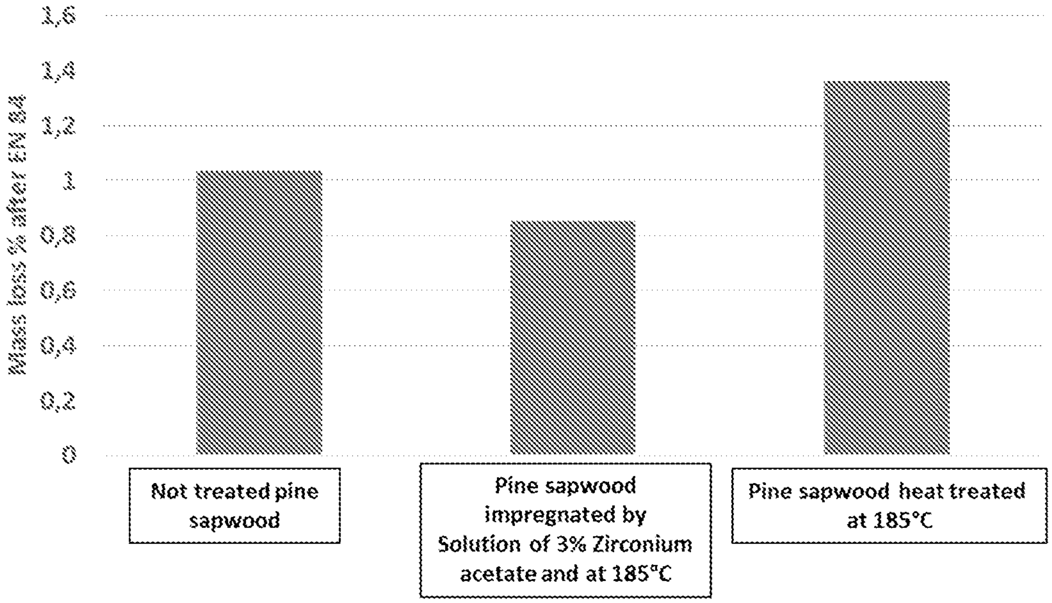
FIG. 7 shows weight loss of impregnated and non-impregnated wood.

As another evidence of the lower degradation of the wood structure to small molecules, the amount of the leached material after leaching test (EN 84) was measured. It can be concluded that heat treated (185° C.) zirconium impregnated wood leached out less than the heat treated (185° C.) and not impregnated wood, see FIG. 7.

Example 7

Table 3 below shows enhancements in water contact angle. As it can be seen, when using water, higher contact angles (CA) could be measured on wood impregnated with Zr salts and heat treated as compared to only heat treated wood.

| Wood sample | Impregnation | Heat treatment | Water contact angle initial | Water contact angle 60s |
|---|---|---|---|---|
| Original pine sapwood | — | — | ~65 | <30 |
| Original pine sapwood | — | 135 | ~65 | ~65 |
| Original pine sapwood | — | 185 | ~65 | ~65 |
| Original pine sapwood | 5% Zr.ac powder | 135 | ~85 | ~85 |
| Original pine sapwood | 5% Zr.ac powder | 185 | ~85 | ~85 |

Table 3

Example 8

Table 4, below shows dimensional expansion of the Pine sapwood dipped in water for 4 days. The chemical changes and the introduced hydrophobicity of the zirconium impregnated heat treated wood could lower the dimensional change of the wood samples in comparison to reference wood and only heat treated wood.

TABLE 4

| Wood sample | Impregnation | Heat treatment | Average dimensional change (Expansion in water %) |
|---|---|---|---|
| Original pine sapwood | — | — | 5.4 |
| Original pine sapwood | — | 135 | 6.8 |
| Original pine sapwood | — | 185 | 5.6 |
| Original pine sapwood | 3%Zr.ac powder | 135 | 3.2 |
| Original pine sapwood | 3%Zr.ac powder | 185 | 4.8 |

Example 9

Figure 8:
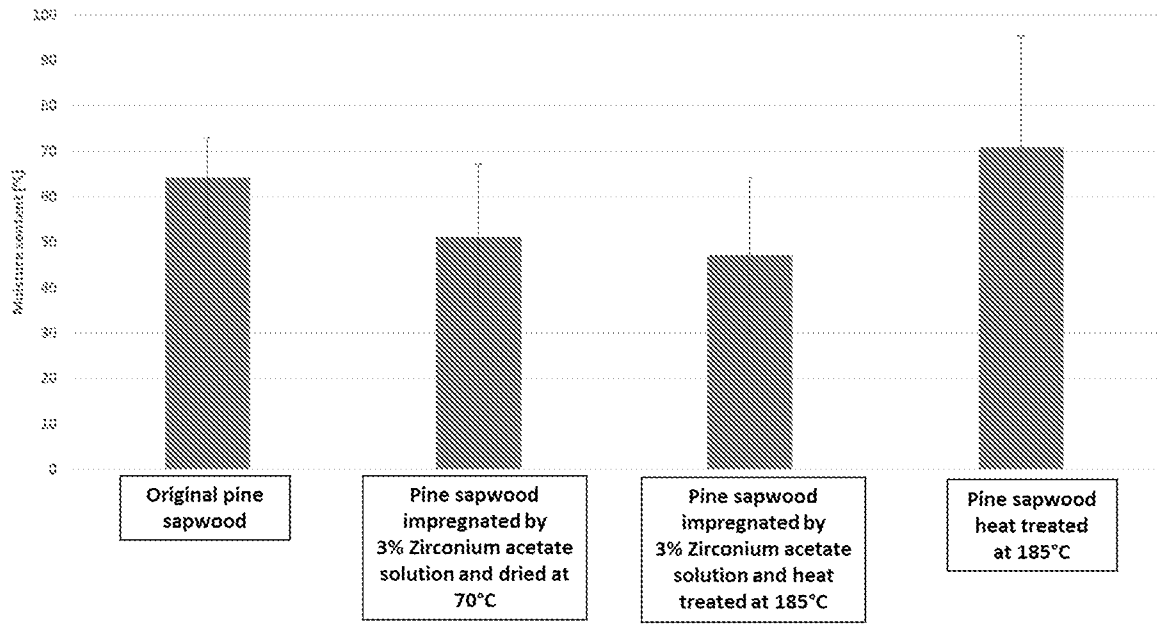
FIGS. 8 and 9 compare moisture content and mass loss of impregnated and non-impregnated wood.
Figure 9:
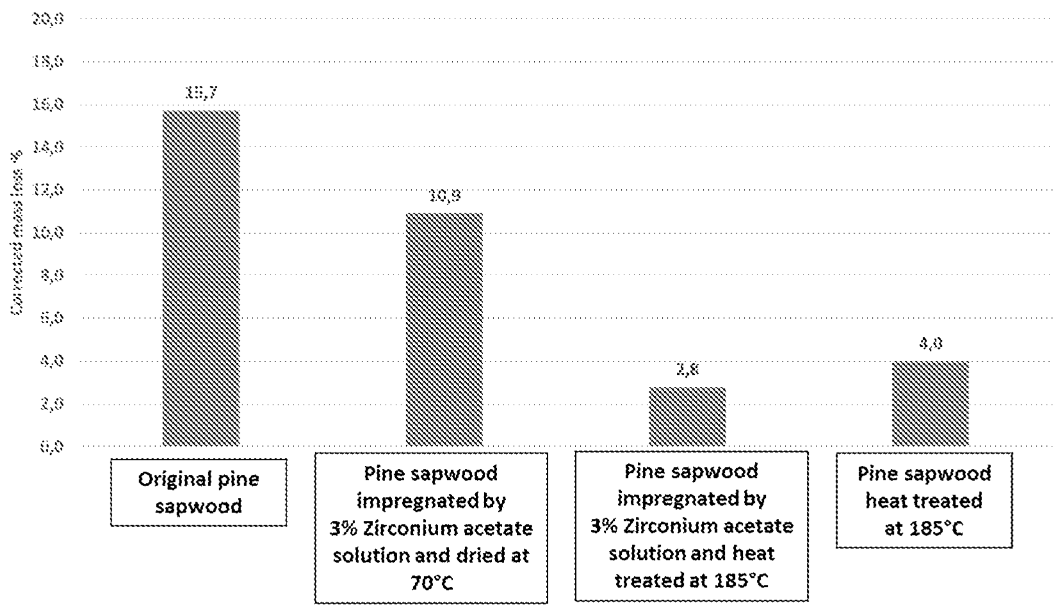

Soft rot protection is performed according to CEN TS 15083-2 (SS-ENV 807:2009). The performed soft rot test using standard SS-ENV 807:2009 displayed lower moisture content of the Zirconium impregnated/heat treated wood compared to the original wood and only heat treated wood at the same temperature, see FIG. 8. This lower moisture content can further decrease the biotic wood deterioration and damage caused by biological deterioration. The decrease in mass loss of the zirconium impregnated/heat treated wood compared to the original wood and only heat treated wood confirmed the efficiency of the heat treated zirconium impregnated wood against soft rot which can be due to both less moisture content and less digestible food sources of the wood. See FIG. 9.

Example 10

Water solution of soluble zirconium salts displayed minimum incompatibility with wood which make the impregnation process very efficient. For example, wood impregnation with 3% zirconium acetate solution at 11 bar yielded an impregnation wet uptake of up to 327 kg/m3 in just 3 hours meaning that almost all the sapwood part of the impregnated wood was saturated with zirconium salt water solution, see Table 5. The deep penetration depth of the zirconium solution will lead to an in depth protection of and longer durability of the final product. This experiment confirms the industrial viability of the invention.

TABLE 5

| Wood type | Wood size | Impregnation formulation | Impregnation time | Impregnation presssure | Wet uptake (kg/m3) | Wood pH after impregnation |
|---|---|---|---|---|---|---|
| Pine timber (blend of Sapwood and heartwood) | 28 mm* 120 mm *2300 mm | 3% Zirconium acetate powder | 60 minutes | 11 bar | ~290 | 4 |

TABLE 5-continued

| Wood type | Wood size | Impregnation formulation | Impregnation time | Impregnation presssure | Wet uptake (kg/m3) | Wood pH after impregnation |
|---|---|---|---|---|---|---|
| Pine timber (blend of Sapwood and heartwood) | 28 mm* 120 mm *2300 mm | 3% Zirconium acetate powder | 180 minutes | 11 bar | ~327 | 4 |

Example 11

In order to assess what happens to the zirconium salt water solution after using it in numerous impregnation cycles an inspection of the aged and reused (10 impregnation cycles) liquid was performed. It was confirmed by observation that minimum chemical and physical changes occurred (no or minimum leaching from wood substrate into the zirconium solution, no instability in the solution and no pH change in the liquid). The observed compatibility will further enhance production efficiency.

Example 12

Figure 10:
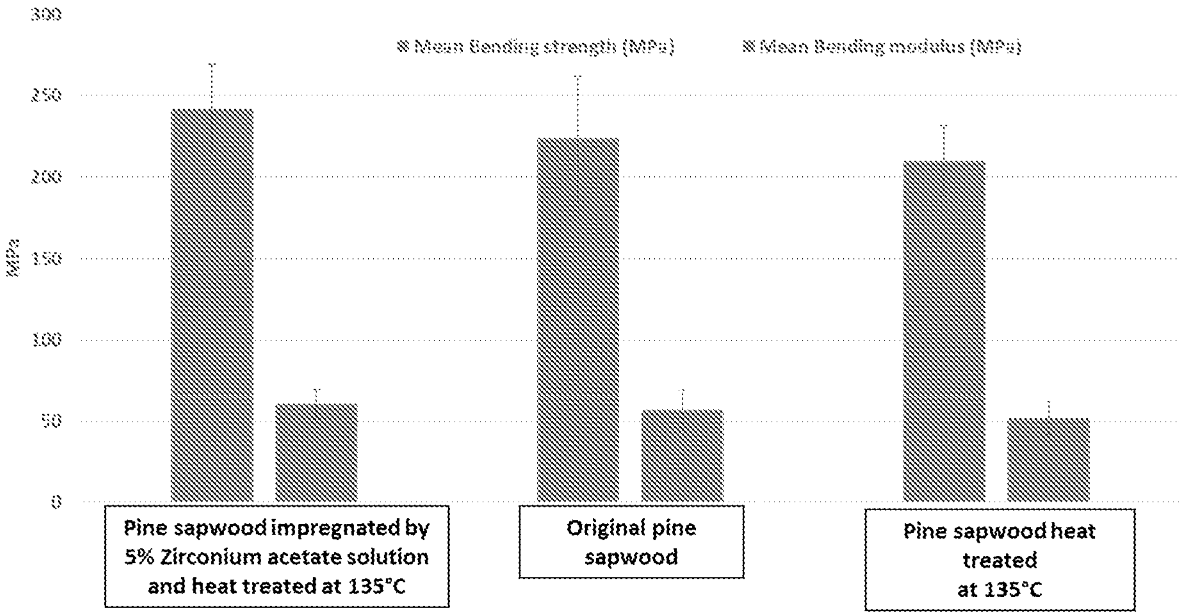
FIG. 10 shows enhancement of the mechanical properties with the present invention.

In general a loss in bending modulus and strength is expected when wood is heat treated. This is also correlating to the degradation within wood obvious by the color change, mass loss and leeching properties of wood as discussed above. In order to further stress the benefits gained from the current invention a three point bending tests on the not treated pine sapwood (original), heat treated pine sapwood at 135° C. and 5% Zirconium acetate impregnated+heat treated (135° C.) pine sapwood was performed. As expected the mechanical properties (both bending modulus and bending strength) were lowered in the heat treated wood case. On the contrary, for zirconium impregnated and heat treated wood, it was concluded that the wood keeps the mechanical properties as compared to untreated or heat treated wood or even enhances them, see FIG. 10.

Example 13

When subjecting samples treated according to the invention to EN 84/EN113 and classification according to SS-EN 350-1 we could see a good protection against both white (*Coriolus versicolor*) and brown rot (*Coniophora puteana* and *Gloeophyllum trabeum*), see Table 6 and 7. Pine sapwood impregnated with 10% Zirconium acetate solution and subsequently heat treated at 135° C. displayed a natural durability class 1 (very durable).

TABLE 6

Classes of natural durability of wood to fungal attack using laboratory tests based on EN 113 (Table from SS-EN 350)

| Durability class | Description | Laboratory test results expressed as x |
|---|---|---|
| 1 | Very durable | x ≤ 0.15 |
| 2 | Durable | 0.15 < x ≤ 0.30 |
| 3 | Moderately durable | 0.30 < x ≤ 0.60 |
| 4 | Slightly durable | 0.60 < x ≤ 0.90 |
| 5 | Not durable | x > 0.90 |

x = average corrected mass loss of e1/average corrected mass loss of e2.1

TABLE 7

| Impregnation | Fungi | Durability class |
|---|---|---|
| 10% ZrAc | *Coniophora puteana* | 1 |
| 10% ZrAc | *Coriolus versicolor* | 1 |
| 10% ZrAc | *Gloeophyllum trabeum* | 1 |

Example 14

Paintability and further modification with other coatings was assessed. Zr impregnated wood, heat treated according to the invention generally exhibited very good compatibility with commercial coatings/paints. Wood impregnated with 10% Zr.ac powder and heat treated at 135° C. and further painted with 1 and 2 layers of commercially available alkyd based paints, aged for 1 year outdoor has still very good quality/properties.

Example 15

The present invention was assessed for mold and fungal Stain (blue stain) protection in wood. When treated samples of the invention and comparative wood samples were subjected to natural weathering conditions for 1 year it could be seen that the comparative samples that were not treated showed intensive fungal growth on the surface and deep into the wood while 10% Zirconium acetate impregnated+135° C. heat treated wood samples were by far less attacked.

The so generally described and exemplified invention has the following benefits. It is environmentally friendly: no halogens, no boric compounds, no phosphorous, no heavy metals, no pesticide, and no biocide. Chemicals are used with no toxic, no health hazard and no environmental hazard pictograms. No organic solvents, only water is used. The invention confers protection against rot and old/mildew protected (wood does not become gray very quickly in the surface and depth when exposed to outdoor climate). Further the invention provides hydrophobicity (increase of dimensional stability, less shrinking and swelling, less cracks) and while it is hydrophobic but still paintable and compatible with water based coatings. Still further, wood products of the present invention has minimal leakage of active components, degradation during the heat treatment is small and controlled and the mechanical properties are improved. Finally, only industrially viable chemicals are used and a process with lowest risk of composition preparation is admitted with an efficient wood impregnation/treatment and high durability/recycling of the corn position during the production cycles.

The invention claimed is:

1. A method of improving degradation resistance of a wood product, comprising:

contacting a wood material with a water-based composition containing no biocide and consisting essentially of one or more zirconium salts selected from the group consisting of zirconium acetate, ammonium zirconium carbonate, zirconium bromide, zirconium chloride, zirconium hydroxynitrate, zirconium nitrate, zirconium oxide diperchlorate octahydrate, zirconium oxychloride, zirconium oxynitrate, zirconium sulfate, zirconium sulfate tetrahydrate, zirconyl chloride, zirconium acetate hydroxide, zirconium orthosulphate and zirconium sulphamate, and optionally at least one or more of: a wetting agent, a defoamer, a conservative, a dye, a pigment, a rheology modifier, and/or a UV stabilizer; and heat treating the wood material at a temperature of between 115°° C. to 200° C., wherein the one or more zirconium salts create physical and chemical bonds with hydroxyl and/or carboxyl groups of the wood material and wherein the one or more zirconium salts are selected so that a protonated counter ion to zirconium in the zirconium salt has a boiling point that is lower than the temperature of heat treating the wood material.

2. The method according to claim 1, wherein the contacting comprises contacting the wood material with the water-based composition comprising 0.01% to 30% (w/w) of zirconium ions from the one or more zirconium salts.

3. The method according to claim 1, wherein the contacting comprises contacting the wood material with the water-based composition comprising 70% to 99.99% (w/w) water and optionally at least one or more of: the wetting agent, the defoamer, the conservative, the dye, the pigment, the rheology modifier, and/or the UV stabilizer.

4. The method according to claim 1, wherein the contacting comprises contacting the wood material with the water-based composition having a pH value of 2 to 13.

5. The method according to claim 1, further comprising: drying the wood material to a moisture content of less than 20% before heat treating the wood material.

6. The method according to claim 1, further comprising: drying the wood material to less than 40% moisture content before contacting the wood material with the water-based composition.

7. The method according to claim 1, further comprising: heating the wood material to temperatures of 5° C. to 250° C. before contacting the wood material with the water-based composition.

8. The method according to claim 1, further comprising: heating the water-based composition to a temperature of less than 100° C. before contacting the wood material with the water-based composition.

9. The method according to claim 7, wherein the heating comprises heating both the wood material and the water-based composition before contacting the wood material with the water-based composition.

10. The method according to claim 1, wherein the heat treating comprises heat treating the wood material at a temperature of between 135° C. to 185° C.

11. The method according to claim 1, wherein the contacting comprises contacting the wood material with the water-based composition comprising 0.1% to 15% (w/w) of zirconium ions from the one or more zirconium salts.

12. The method according to claim 1, wherein the contacting comprises contacting the wood material with the water-based composition comprising 0.2% to 6% (w/w) of zirconium ions from the one or more zirconium salts.

13. The method according to claim 1, wherein the contacting comprises contacting the wood material with the water-based composition, the water-based composition containing no biocide and consisting essentially of the one or more zirconium salts and at least one or more of:

the wetting agent present in amounts of less than 7% (w/w), the defoamer, the conservative, the dye present in amounts of less than 7% (w/w), the pigment present in amounts of less than 7% (w/w), the rheology modifier present in amounts between 0.5% to 5% (w/w), and/or the UV stabilizer present in amounts of less than 7% (w/w).

14. The method according to claim 1, wherein the contacting comprises contacting the wood material with the water-based composition having a pH value of 2 to 11.

15. The method according to claim 1, wherein the contacting comprises contacting the wood material with the water-based composition having a pH value of 2 to 9.

16. The method according to claim 1, wherein the contacting comprises contacting the wood material with the water-based composition having a shelf life of more than 1 month at temperatures ranging from 0° C. to 65° C.

17. The method according to claim 1, wherein the contacting is performed by soaking, impregnating, padding, foularding, dipping, spraying, brushing, coating, rolling, or foam-application.

18. The method according to claim 17, wherein the contacting is performed by vacuum pressure impregnation.

* * * * *